United States Patent
Kleindl et al.

(10) Patent No.: US 12,221,026 B2
(45) Date of Patent: Feb. 11, 2025

(54) VEHICLE SEAT HAVING A FOOT AND/OR CALF SUPPORT

(71) Applicant: Bayerische Motoren Werke Aktiengesellschaft, Munich (DE)

(72) Inventors: Sylvia Kleindl, Munich (DE); Michael Leng, Geltendorf (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 88 days.

(21) Appl. No.: 18/027,281

(22) PCT Filed: Sep. 30, 2021

(86) PCT No.: PCT/EP2021/076955
§ 371 (c)(1),
(2) Date: Mar. 20, 2023

(87) PCT Pub. No.: WO2022/069639
PCT Pub. Date: Apr. 7, 2022

(65) Prior Publication Data
US 2023/0356640 A1  Nov. 9, 2023

(30) Foreign Application Priority Data
Sep. 30, 2020 (DE) .................. 10 2020 125 494.6

(51) Int. Cl.
*B60N 2/90* (2018.01)
(52) U.S. Cl.
CPC .................... *B60N 2/995* (2018.02)
(58) Field of Classification Search
CPC ..... A47C 7/506; B60N 2/995; B64D 11/0643
(Continued)

(56) References Cited

U.S. PATENT DOCUMENTS 2,015,335 A * 9/1935 Blumenthal ............ A47C 4/40
297/29
2,563,629 A   8/1951 Watter
(Continued)

FOREIGN PATENT DOCUMENTS

DE        100 47 739 A1   4/2002
DE   10 2004 050 730 A1   4/2006
(Continued)

OTHER PUBLICATIONS

International Search Report (PCT/ISA/210) issued in PCT Application No. PCT/EP2021/076955 dated Jan. 25, 2022 with English translation (five (5) pages).
(Continued)

*Primary Examiner* — Jose V Chen
(74) *Attorney, Agent, or Firm* — Crowell & Moring LLP (57) ABSTRACT

A vehicle seat has a foot and/or calf support, a lower seat part which has a seat surface and can be coupled to a vehicle structure having an interior floor in a preferably longitudinally displaceable manner, and a backrest having a backrest surface. The foot and/or calf support has a support surface that is arranged in front of the lower seat part and is movable between a stowed position and a use position. The foot and/or calf support is arranged with a first seat-side edge in front of, on or under the lower seat part and includes a free edge which is remote from the seat-side edge and is arranged in front of the lower seat part so as to be spaced apart from the lower seat part and is coupled to the vehicle structure. The foot and/or calf support is formed by or has at least one support element having the support surface, the support element being designed as an at least two-dimensionally flexible sheet material.

20 Claims, 4 Drawing Sheets

(58) Field of Classification Search
USPC .................................. 297/423.27, 423.19
See application file for complete search history.

(56) References Cited

U.S. PATENT DOCUMENTS

| | | | | |
|---|---|---|---|---|
| 2,609,864 | A * | 9/1952 | Gates, Jr. ............... | A61G 5/128 |
| | | | | 297/423.19 |
| 2,626,653 | A * | 1/1953 | Van Wyck ............... | A47C 4/12 |
| | | | | 297/19 |
| 2,834,032 | A * | 5/1958 | Scott ..................... | A61G 7/065 |
| | | | | 5/632 |
| 4,264,103 | A * | 4/1981 | Peresada ................ | B60N 2/995 |
| | | | | 297/423.27 |
| 4,534,594 | A * | 8/1985 | Lucien ................... | A47C 16/02 |
| | | | | 297/423.27 |
| 5,061,011 | A * | 10/1991 | Miller .................... | A47C 1/143 |
| | | | | 297/423.27 |
| 5,312,161 | A * | 5/1994 | Mars ..................... | A47C 7/626 |
| | | | | 297/423.21 |
| 5,447,359 | A * | 9/1995 | Asbjornsen ........ | B64D 11/0641 |
| | | | | 297/423.26 |
| 9,155,394 | B1 * | 10/2015 | Cohen ................... | A47C 7/506 |
| 2006/0261648 | A1 * | 11/2006 | Wagner ................. | B60N 2/995 |
| | | | | 297/216.1 |
| 2013/0045825 | A1 * | 2/2013 | Yin ......................... | B60N 2/62 |
| | | | | 74/89.14 |
| 2021/0206303 | A1 * | 7/2021 | Petit ........................ | B60N 2/06 |
| 2022/0250751 | A1 * | 8/2022 | Aubrun .................. | B60N 2/995 |
| 2022/0332233 | A1 * | 10/2022 | Gropp .................... | B60N 2/995 |

FOREIGN PATENT DOCUMENTS

| | | |
|---|---|---|
| DE | 10 2005 013 170 A1 | 10/2006 |
| DE | 10 2006 045 206 A1 | 4/2008 |
| DE | 10 2010 012 767 A1 | 9/2011 |
| DE | 10 2012 003 763 A1 | 8/2013 |
| DE | 10 2017 200 592 A1 | 7/2018 |
| EP | 1 116 653 A2 | 7/2001 |
| EP | 3 132 969 A1 | 2/2017 |
| FR | 2 952 594 A1 | 5/2011 |
| JP | 58-141964 U | 9/1983 |
| JP | 4-133760 U | 12/1992 |
| JP | 2003-237450 A | 8/2003 |
| JP | 2012-11097 A | 1/2012 |
| KR | 10-0925953 B1 | 11/2009 |
| WO | WO 01/87120 A1 | 11/2001 |

OTHER PUBLICATIONS

German-language Written Opinion (PCT/ISA/237) issued in PCT Application No. PCT/EP2021/076955 dated Jan. 25, 2022 (six (6) pages).

German-language Search Report issued in German Application No. 10 2020 125 494.6 dated Aug. 24, 2021 with partial English translation (10 pages).

* cited by examiner

VEHICLE SEAT HAVING A FOOT AND/OR CALF SUPPORT

BACKGROUND AND SUMMARY

The invention relates to a vehicle seat having a foot and/or calf support. It also relates to a vehicle, in particular a motor vehicle, having at least one such vehicle seat.

The increasing demands for comfort in vehicles, in particular in motor vehicles, gives rise to the desire for comfort-enhancing (reclining) seats having foot and/or calf supports. In particular in self-driving motor vehicles of the future, the vehicle passengers will be able to use the journey time in the vehicle in order to relax and unwind and will expect such comfort-enhancing seats to be present.

DE 10 2010 012 767 A1 discloses a vehicle seat having a foot support which has a resting panel for the feet of a passenger sitting on the vehicle seat, the resting panel being arranged in front of the vehicle seat and being movable in relation to the vehicle floor. The resting panel can be inclined upward, by way of the end remote from the seat, about a transverse axis located at the seat end of the panel. A slide is guided for sliding displacement on the longitudinal sides of the resting panel and is connected to the vehicle seat via a flexible resting element for the passenger's lower legs.

DE 10 2005 013 170 A1 discloses a footrest for a vehicle, the footrest having supporting panels for the lower legs of a passenger sitting on a vehicle seat, and being arranged in front of the vehicle seat and being pivotable from a vertical, storage position beneath the front edge of the vehicle seat into a horizontal, supporting position, in which the supporting panels can be extended telescopically.

DE 10 2004 050 730 A1 discloses and describes a vehicle-seat arrangement, which has vehicle seats arranged one behind the other, in an aircraft, wherein a flexible supporting part, which is arranged beneath a seat in front and can be pulled out in the rearward direction in the manner of a roller-blind arrangement, can be fitted on the base of a seat located behind and, in the fitted state, forms a rest for the feet and lower legs of a passenger sitting on the seat behind.

DE 10 2017 200 592 A1 discloses a vehicle seat having a calf support which—in a manner similar to a crawler chain—is designed in the form of a slat-link chain with rigid slat links and is arranged beneath the vehicle seat. The slat chain, which has its upper edge fastened on the lower seat part, can be pushed forward by means of an actuating arrangement, as a result of which it moves in front of the lower seat part and forms a sloping surface, or calf support, there.

The object of the present invention is to provide an improved vehicle seat having a foot and/or calf support which operates without complex mechanics and, when not in use, can be stowed in a space-saving manner in front of or beneath the vehicle seat.

This object is achieved by the vehicle seat in accordance with the independent claims.

A vehicle seat which achieves this object is provided with a foot and/or calf support, with a lower seat part, which has a seat surface and can be coupled, preferably for longitudinal sliding displacement, to a vehicle structure, and with a backrest, which has a backrest surface, wherein the foot and/or calf support, which is provided with a resting surface, is arranged in front of the lower seat part and can be moved between a stowage position and a use position. The foot and/or calf support is arranged, by way of a first, seat-side edge, in front of, on or beneath the lower seat part and has a free edge, which is directed away from the seat-side edge and is spaced apart in front of the lower seat part and is coupled to the vehicle structure. This vehicle seat is distinguished, according to the invention, in that the foot and/or calf support is formed by, or has, at least one supporting element, which has the resting surface. The supporting element is configured in the form of an at least two-dimensionally flexible sheet-like structure. A two-dimensionally flexible sheet-like structure is understood here to mean a material web which, in comparison with its surface-area extent, is thin and which is inherently flexible about a multiplicity of non-parallel bending axes, for example a material web made of a textile material, a sheet material, leather or a net material.

The foot and/or calf support provided according to the invention, when not in use, can be moved in a space-saving manner into a stowage position in front of, on or beneath the vehicle seat and, if required, can be moved into the use position, in which the material web, which forms the two-dimensionally flexible sheet-like structure with the resting surface, assumes an inclined position between its higher-level, seat-side edge and its lower-level, free edge.

Further preferred and advantageous features of the vehicle seat according to the invention form the subject matter of the dependent claims.

The flexible sheet-like structure of the supporting element is preferably formed from a textile web, a sheet web or a net material. Such a sheet-like structure, when not in use, can be accommodated in a space-saving manner in the stowage position in front of or beneath the lower seat part. When arranged vertically in front of the lower seat part, it is possible, at the same time, for the sheet-like structure to perform the function of a cover for the seat-console opening which is present between the lower seat part and the passenger-compartment floor.

It is also advantageous if the flexible sheet-like structure of the supporting element is elastically deformable and, in the use position, has been stretched in the longitudinal direction. This variant provides resilient support for a passenger's foot or calf, and this enhances the passenger's comfort. In addition, this elasticity in the longitudinal direction allows longitudinal adjustment of the vehicle seat without any need for the free edge of the foot and/or calf support to be shifted in the longitudinal direction. If the free edge is connected, for example, firmly to the passenger-compartment floor or to a foot matt fixed on the passenger-compartment floor, the resting surface of the foot and/or calf support can open out automatically by means of the longitudinal seat adjustment in the longitudinal direction as a result of the vehicle seat being moved back. This longitudinal stretching capability allows for example the hardness of the resting surface to be altered and, in the case of intermittent longitudinal stretching, a massage effect can be achieved.

As an alternative or in addition, it is possible for the flexible and elastically deformable sheet-like structure of the supporting element, in the use position, to be stretched in the transverse direction. This transverse stretching allows for example the hardness of the resting surface to be altered and here too, in the case of intermittent transverse stretching, a massage effect can be achieved.

In a preferred embodiment of the invention, which can be combined with other embodiments, the free edge, which is directed away from the seat-side edge, is provided, on its sides, with guide elements, which are guided for longitudinal sliding displacement in a guide-rail arrangement, which is connected to the vehicle structure. This allows the free edge of the foot and/or calf support to move forward, away from the vehicle seat, along the guide-rail arrangement, wherein the resting surface opens out and forms a means of support for the feet and the lower legs of a vehicle passenger sitting on the vehicle seat.

The foot and/or calf support preferably has its first, seat-side edge connected to the lower seat part.

It is also advantageous if the foot and/or calf support is formed by, or has, at least two flexible supporting-element portions, which form the resting surface and can be moved telescopically relative to one another, the supporting-element portions together forming the supporting element.

In another advantageous variant, the supporting element comprises, or has, a roller-blind arrangement, which forms the resting surface. This allows the foot and/or calf support to be accommodated in a space-saving manner in the stowage position.

It is advantageous here if the roller-blind arrangement is arranged either on or beneath the lower seat part or if it is arranged in front of the lower seat part and is connected to the passenger-compartment floor directly or indirectly via a foot matt. For example, it is possible for such a roller-blind arrangement to be integrated in the passenger-compartment floor or in a foot matt and to have its winding mechanism installed in a concealed manner beneath the surface of the passenger-compartment floor or foot matt, so that the sheet-like structure of the roller-blind arrangement exits in the upward direction out of a slot in the passenger-compartment floor or the foot matt.

A particularly preferred embodiment of the vehicle seat according to the invention, which can be combined with other embodiments, is one in which the guide-rail arrangement has a left-hand rail and a right-hand rail, which is spaced apart laterally from the left-hand rail, wherein a guide element, which is provided on the left-hand side of the free edge of the foot and/or calf support, is accommodated by the left-hand rail for displacement in the manner of a slide, and in that a guide element, which is provided on the right-hand side of the free edge of the foot and/or calf support, is accommodated by the right-hand rail for displacement in the manner of a slide.

It is advantageous here if the guide elements can be slidably displaced synchronously in the respective guide rails by means of at least one drive device, which acts on them.

It is also advantageous if the guide rails describe a curved path in a respective longitudinal vertical plane.

An advantageous embodiment of the invention here is the one in which the guide rails can be shifted, for example by sliding, relative to one another in the transverse direction. Such sliding displacement capability in the transverse direction, in which the guide rails preferably remain aligned parallel to one another at all times, allows the flexible sheet-like structure, which defines the resting surface of the foot and/or calf support, to stretch in the transverse direction, and therefore allows the hardness of the resting surface to be adjusted.

Also particularly preferred is an embodiment of the vehicle seat according to the invention which can be combined with other embodiments and in which the foot and/or calf support is provided with at least one inflatable cushion portion in the region of the resting surface.

The invention also covers a vehicle, in particular a motor vehicle, having at least one vehicle seat according to the invention.

In the stowage position, the foot and/or calf support, for example designed in the form of a flexible supporting element, for example made of fabric, or in the form of a roller-blind arrangement or of an arrangement of telescopic panel elements, has been tensioned in the downward direction from the lower seat part, in particular from the seat surface, of the vehicle seat, wherein, in a particularly preferred embodiment, the free end of the support is guided, on its sides, in a guide-rail arrangement in the footwell. Displacement of the free end in the longitudinal direction of the vehicle causes the foot and/or calf support, with its resting surface, to slide forward relative to the seat surface and to form a resting surface for the calves and/or the feet. The guide rails can be provided on or in the passenger-compartment floor or a foot matt.

The guide-rail arrangement can be of linear or curved design in order also to allow, if appropriate, vertical adjustment. The adjustment can take place via manual, electrical or pneumatic systems; it can also be map-controlled.

As an alternative, it is also possible for the foot and/or calf support to be fastened on a front seat, so that, when the front seat is adjusted, a calf rest or footrest is provided for a vehicle seat arranged behind. It is additionally possible for a pneumatic system to be fitted in the region of the resting surface, so that the resting surface can be inflated in order to enhance comfort.

Preferred exemplary embodiments of the invention along with additional details and further advantages will be explained and described in more detail hereinbelow with reference to the accompanying drawing.

DETAILED DESCRIPTION OF THE DRAWINGS

Figure 1:
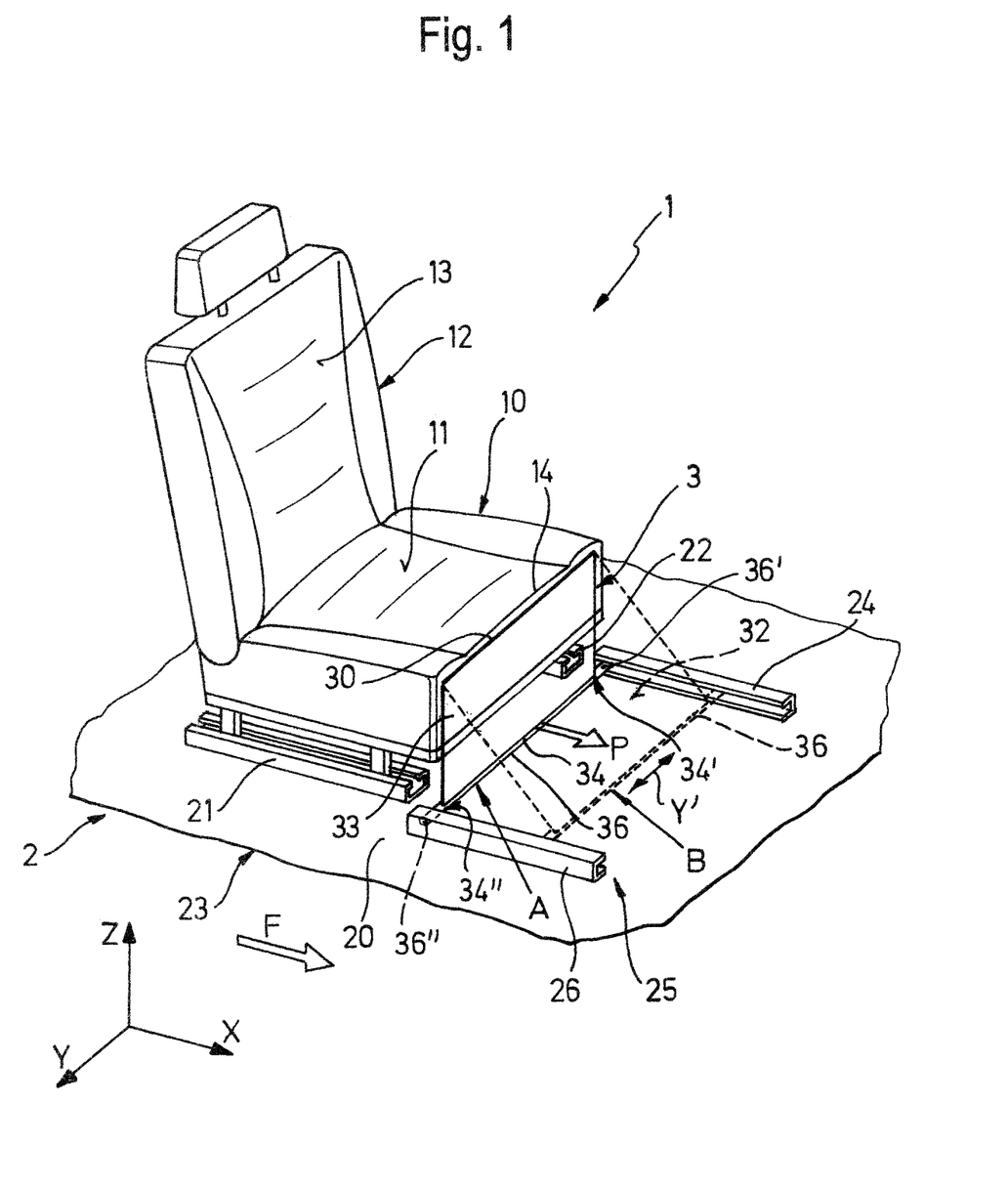
FIG. 1 is a schematic perspective view of a first embodiment of the vehicle seat according to the invention.

FIG. 1 shows a vehicle seat 1 which is fitted in a customary manner, by means of longitudinal-adjustment rails 21, 22, on the passenger-compartment floor 20 of a vehicle structure 23 of a motor vehicle 2 such that it can be adjusted in the longitudinal direction X of the vehicle. The vehicle seat 1 has a lower seat part 10 with a seat surface 11 and also has a backrest 12 with a backrest surface 13, the backrest being articulated on the lower seat part 10 such that it can be inclined.

A flexible supporting element 33 of a foot and/or calf support 3 is fitted, by way of a first, seat-side edge 30, on the front edge 14 of the seat surface 11. In the example of FIG. 1, the supporting element 33 is formed from a net-like elastic fabric, which has been tensioned downward in the direction of the vehicle floor from the seat-side edge 30 (stowage position A). On its free edge 34, which is directed away from the seat-side edge 30, the supporting element 33 is provided with a transverse strut 36, which extends in the transverse direction Y of the vehicle and which holds the net-like fabric of the supporting element 33 tensioned.

The free edge 34 with its transverse strut 36 is provided, on its outer sides 34', 34", with a respective guide element 36', 36", which is formed, for example, by a slide provided at the respective lateral end of the transverse strut 36. The respective guide element 36', 36" is guided for sliding displacement in the longitudinal direction X of the vehicle in a respective rail 24, 26, which runs in the longitudinal direction X of the vehicle, wherein the guide rails 24, 26 are connected to the vehicle structure 23 and form a guide-rail arrangement 25 for the transverse strut 36, which is provided on the free edge 34 of the supporting element 33.

A respective drive device (not shown) is provided in the guide rails 24, 26, the drive device acting on the respective guide element 36', 36" and moving the latter along the associated guide rail 24, 26 in the longitudinal direction X of the vehicle, as a result of which the transverse strut 36 can be displaced forward or back, as is symbolized by the forward-directed arrow P in FIG. 1. If the transverse strut 36, and with it the free edge 34 of the flexible supporting element 33 of the foot and/or calf support 3, is displaced forward in the direction of the arrow P, then the elastic and flexible supporting element 33 stretches into the position illustrated by dashed lines in FIG. 1 (use position B) and, rather than running vertically downward from the front edge 14 of the seat surface 11, runs—in a stretched state—obliquely forward and downward and, in this way, forms a resting surface 32 for the calves of a passenger sitting on the seat 1. The supporting element 33 can have at least one inflatable cushion portion (not illustrated) in the region of the resting surface 32, in order to enhance the comfort or—in the case of a plurality of cushion portions—to adapt the contour of the resting surface 32 to the passenger's requirements.

According to a specific embodiment of the vehicle seat shown in FIG. 1, the guide rails 24, 26 can be shifted, for example by sliding, relative to one another in the transverse direction Y, as is illustrated symbolically by the double arrow Y' in FIG. 1. This makes it possible to change the tensioning acting on the flexible and elastic resting surface 32 in the transverse direction Y, and therefore the hardness of the resting surface 32. Repeated tensioning and loosening of the elastic and flexible resting surface in the transverse direction Y can achieve a massage effect.

Figure 1A:
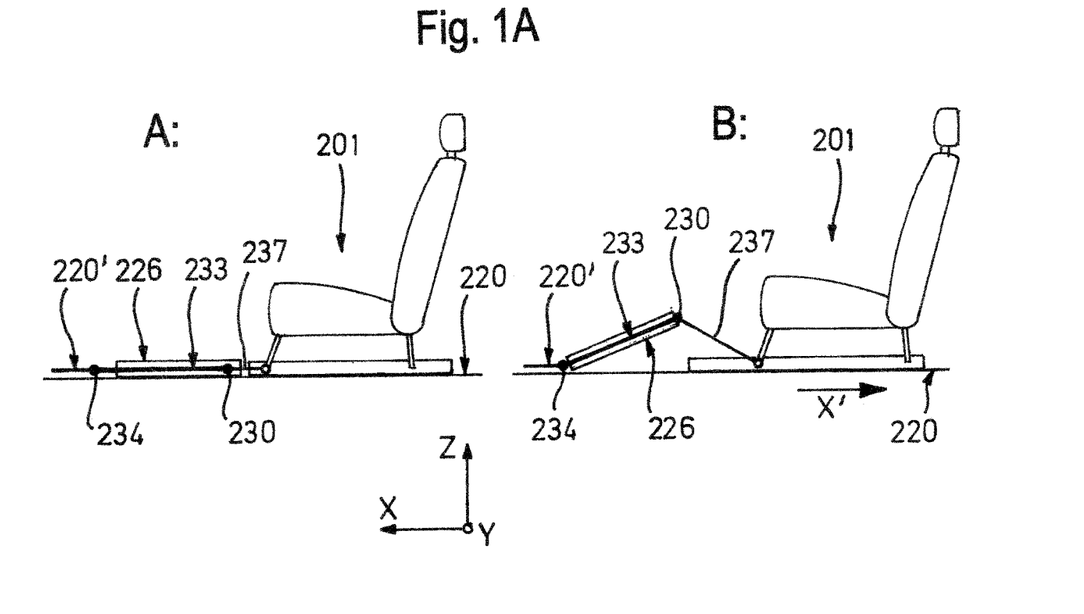
FIG. 1A is a schematic side-view illustration of a variant of the first embodiment, in the stowage position (A) and the use position (B)

FIG. 1A illustrates a schematic side-view illustration of a variant of the first embodiment of the vehicle seat 201 according to the invention, in the stowage position (A) and the use position (B). The supporting element 233 with the flexible and elastic resting surface is integrated, in the stowage position A, in the foot matt 220' or the covering of the passenger-compartment floor 220, for example it is formed therefrom, or it has its front, free edge 234 attached thereto, wherein the seat-side edge 230 of the flexible and elastic supporting element 233 is guided in the guide rails 226, 224 (not shown). The guide rails 226, 224 are mounted for pivoting in the vertical direction Z, so that the seat ends of the guide rails 226, 224 can be raised. The guide rails can also be integrated in the passenger-compartment floor or, as an alternative, in the foot matt 220'. The elastic and flexible supporting element 233 can be coupled to the lower seat part and/or to the backrest for example via mechanical or electromechanical actuating mechanism, such as a cable-pull or Bowden-cable connection 237, as a result of which the resting surface of the supporting element can be adjusted in the longitudinal direction via the longitudinal adjustment of the seat and/or the inclination adjustment of the backrest, for example in a map-controlled manner, as is illustrated by the arrow X' in FIG. 1A, this arrow symbolizing the rearwardly shifted vehicle seat 201. It is also possible for the inclination of the guide rails to be adjusted in an equivalent manner by way of such mechanical or electromechanical actuating mechanism. Repeated tensioning and loosening of the elastic and flexible resting surface of the supporting element 233 in the longitudinal direction X can likewise achieve a massage effect.

Figure 2:
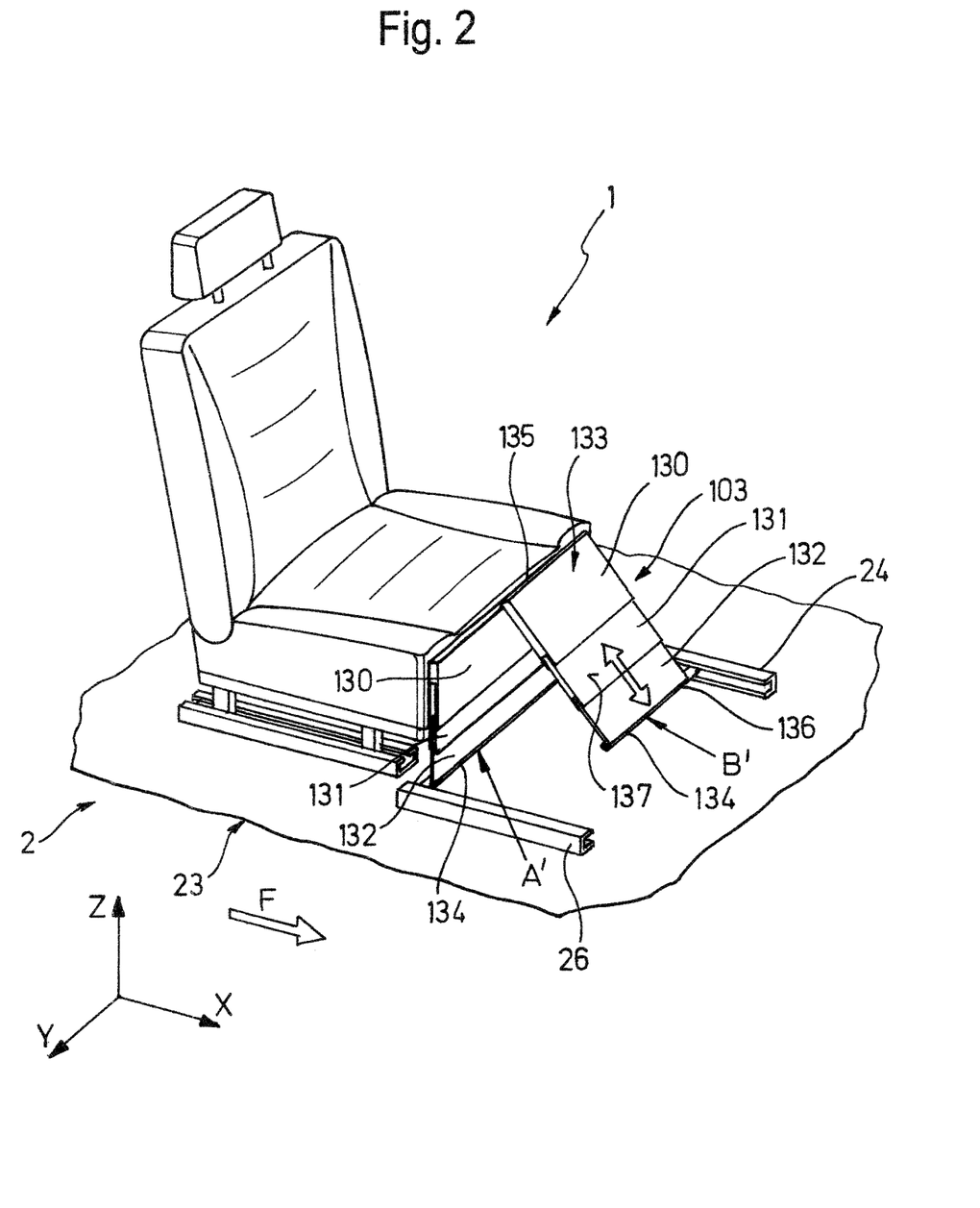
FIG. 2 is a schematic perspective view of a second embodiment of the vehicle seat according to the invention.

FIG. 2 shows an alternative embodiment of a foot and/or calf support 103 on a vehicle seat 1. The vehicle seat 1 is constructed in the same way as the vehicle seat in FIG. 1 and is also, likewise, connected to the vehicle structure 23. It is also the case that the guide rails 24, 26 are provided, in the same way, in front of the vehicle seat 1 and are connected to the vehicle structure 23, as has been described in connection with FIG. 1.

FIG. 2 illustrates the foot and/or calf support 103 in two states, namely, on the left-hand side, as seen in the direction of travel F, in its use position B', in which it has been extended forward, and, on the right-hand side, as seen in the direction of travel F, in the stowage position A'.

In the example shown, the foot and/or calf support 103 has, as its supporting element 133, three panel elements 130, 131, 132, which run in the transverse direction Y of the vehicle and can be moved telescopically relative to one another, and one inside the other, at right angles to the free edge 134 and to the seat-side edge 135, as is illustrated symbolically by the double arrow in FIG. 2.

If, then, the free edge 134 of the supporting element 133 of the foot and/or calf support 103, said free edge being provided with the transverse strut 136, is moved forward in the direction of travel F, the telescopic supporting element 133 is pivoted about the seat-side edge 135 and the flexible supporting-element portions 131, 132, which can be moved, for example by sliding, telescopically relative to one another, extend telescopically from their respective position in which they are held in the respectively accommodating flexible supporting-element portion 130, 131, as is illustrated in connection with the use position B' in FIG. 2. In an analogous manner, the supporting-element portions move telescopically one inside the other again if the transvers strut 136 is moved back in the rearward direction, that is to say in the direction of the vehicle seat 1. The supporting element 133 moved into the use position B' forms a flexible resting surface 137 for the passenger's calves. Here too, the resting surface 137 can be provided with at least one inflatable cushion.

Figure 3:
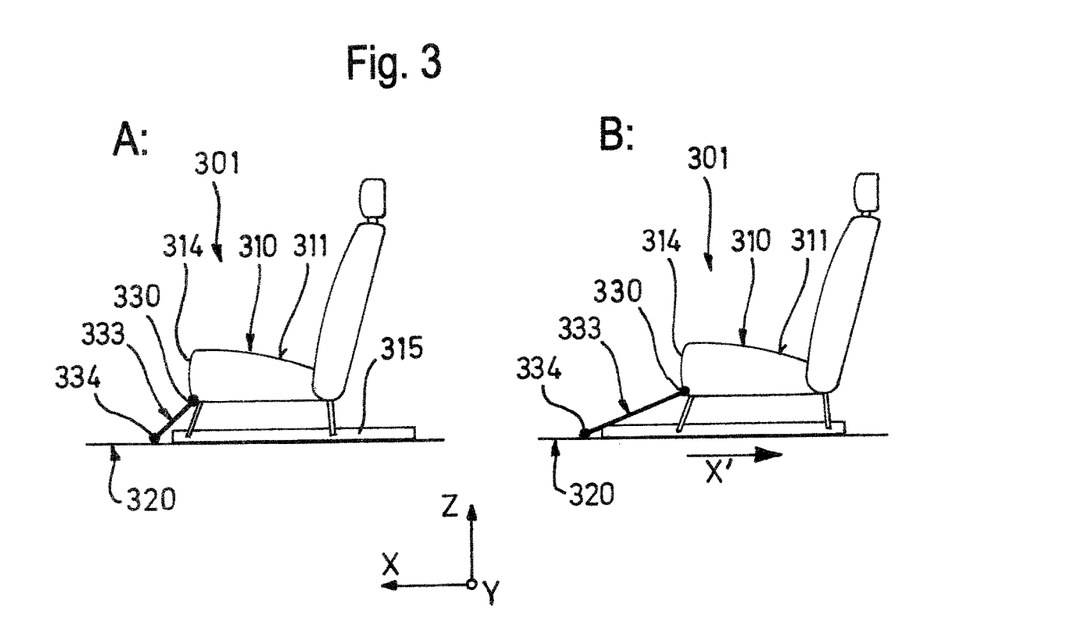
FIG. 3 is a schematic side-view illustration of a third embodiment of the vehicle seat according to the invention, in the stowage position (A) and the use position (B)

FIG. 3 illustrates a schematic side-view illustration of a third embodiment of the vehicle seat 301 according to the invention, in the stowage position A and the use position B. The supporting element 333 with the flexible and elastic resting surface, in the stowage position A, is arranged essentially vertically beneath the front edge 314 of the seat surface 311, so that it essentially covers the front opening of the seat console 315 between the lower seat part 310 and the passenger-compartment floor 320. The front, free edge 334 of the flexible supporting element 333 is fastened on the passenger-compartment floor 320 and the seat-side edge 330 is fitted on the lower seat part 310. This means that, when the vehicle seat 301 moves back in the direction of the arrow X', the flexible and elastic supporting element 333 is stretched and opens out obliquely in front of the vehicle seat. The seat-side edge 330 of the supporting element 333 can advantageously also be connected directly to the seat cushion of the seat surface 311 of the lower seat part 310 in the region of the front edge 314, this creating a resting surface 332 which adjoins the seat surface 311 without interruption.

Figure 4:
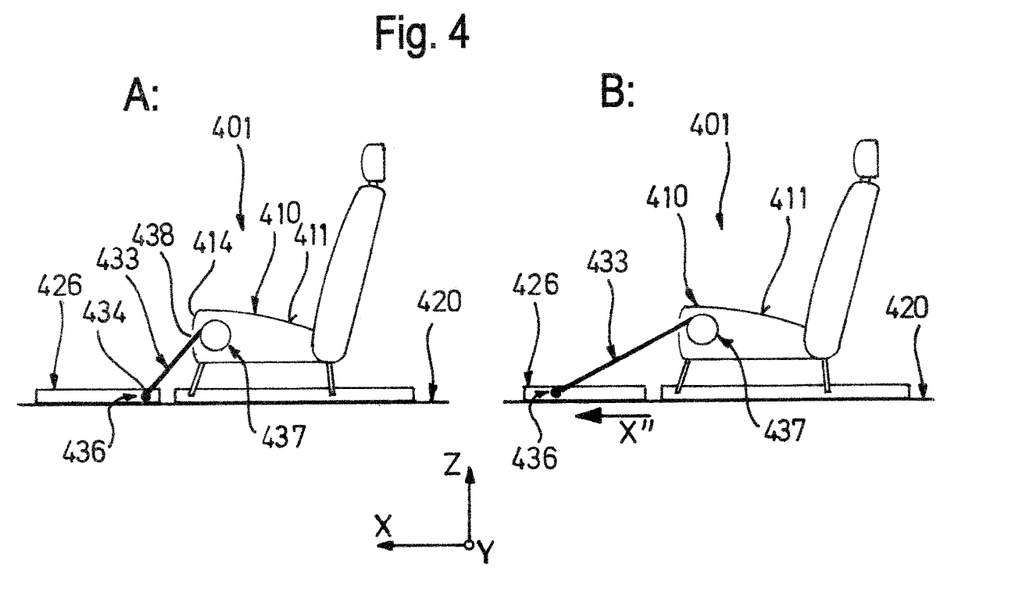
FIG. 4 is a schematic side-view illustration of a fourth embodiment of the vehicle seat according to the invention, in the stowage position (A) and the use position (B)

FIG. 4 shows a schematic side-view illustration of a fourth embodiment of the vehicle seat 401 according to the invention, in the stowage position A and the use position B. In the case of this embodiment, a roller-blind-like mount 437, which forms a roller blind, is provided in the region of the front edge 414 of the seat surface 411, the flexible supporting element 433 being wound up in the mount. In a manner analogous to the example of FIG. 1, the front, free edge 434 of the flexible supporting element 433, said free edge being provided with a transverse strut 436, is guided in lateral guide rails and can be slidably displaced, by drive means, in the longitudinal direction X, only the right-hand guide rail 426 being shown here.

When the transverse strut 436 is being moved forward in the direction of the arrow X" and/or when the vehicle seat 401 is being moved rearward, the supporting element 433 is unwound in the manner of a roller blind. In the case of this variant, the flexible supporting element 433 need not be elastic. The roller-blind-like mount 437 can be fitted at the front, in front of or beneath the lower seat part 410, or it can be integrated in the lower seat part 410 and the flexible supporting element 433 can exit from the lower seat part 410 in the forward direction, for example, from an exit slot 438 in the region of the front edge 414 of the lower seat part 410. It is possible for the front, free edge 434 of the flexible supporting element 433—as shown in FIG. 4—to be guided in guide rails or—as in the example of FIG. 3—to be connected firmly to the passenger-compartment floor 420.

Figure 5:
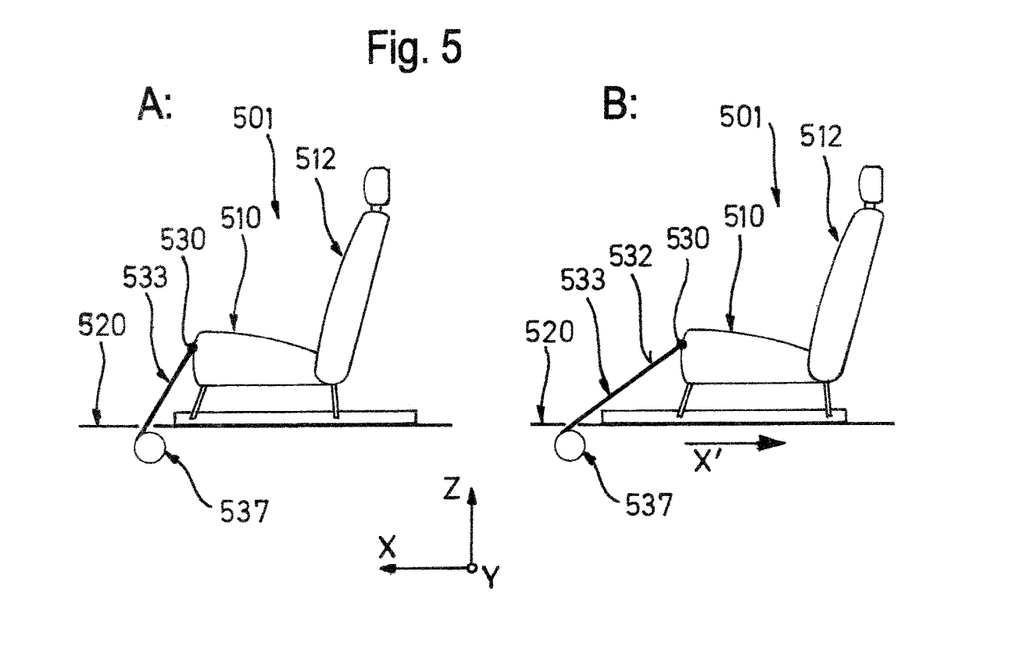
FIG. 5 is a schematic side-view illustration of an alternative to the fourth embodiment of the vehicle seat according to the invention, in the stowage position (A) and the use position (B).

As an alternative, the seat-side edge 530 of the flexible supporting element 533—as illustrated in FIG. 5—is fitted on the lower seat part 510 and the roller-blind-like mount 537, likewise forming a roller blind, along with the free edge of the supporting element 533, is fitted in or on the passenger-compartment floor 520. When the vehicle seat 501 is being moved rearward in the direction of the arrow X', the flexible supporting element 533 unrolls from the roller-blind-like mount 537 and forms the resting surface 532. As an alternative, or in addition, the roller-blind-like mount 537—like the front edge of the supporting element in the example of FIG. 1—can be guided in lateral guide rails (not illustrated in FIG. 5) and can be slidably displaced, by drive means, in the longitudinal direction X. This is advantageous, in particular, when the flexible supporting element 533 is to be unrolled when the backrest 512 is being inclined rearward, driven via an electromechanical drive or via a cable pull.

The invention is not restricted to the exemplary embodiments above, which serve merely to give a general explanation of the core concept of the invention. Rather, in line with the scope of protection, the apparatus according to the invention can also take on configurations other than those described above. In particular, the apparatus here can have features which constitute a combination of the respective individual features of the claims. Reference signs in the claims, the description and the drawings serve merely to give a better understanding of the invention and should not limit the scope of protection.

LIST OF REFERENCE SIGNS

1 Vehicle seat
2 Motor vehicle
3 Foot and/or calf support
10 Lower seat part
11 Seat surface
12 Backrest
13 Backrest surface
14 Front edge
20 Passenger-compartment floor
21 Longitudinal-adjustment rail
22 Longitudinal-adjustment rail
23 Vehicle structure
24 Left-hand guide rail
25 Guide-rail arrangement
26 Right-hand guide rail
30 Seat-side edge
32 Resting surface
33 Flexible supporting element
34 Free edge
34' Outer side
34" Outer side
36 Transverse strut
36' Guide element
36" Guide element
103 Foot and/or calf support
130 Supporting-element portion
131 Supporting-element portion
132 Supporting-element portion
133 Supporting element
134 Free edge
135 Seat-side edge
136 Transverse strut
137 Resting surface
201 Vehicle seat
220 Passenger-compartment floor
220' Foot mat
224 Guide rail
226 Guide rail
230 Seat-side edge
233 Elastic and flexible supporting element
234 Front, free edge
237 Cable-pull or Bowden-cable connection
301 Vehicle seat
310 Lower seat part
311 Seat surface
314 Front edge
315 Seat console
320 Passenger-compartment floor
330 Seat-side edge
332 Resting surface
333 Flexible and elastic supporting element
334 Front, free edge
401 Vehicle seat
410 Lower seat part
411 Seat surface
414 Front edge
420 Passenger-compartment floor
426 Right-hand guide rail
433 Flexible supporting element
434 Front, free edge
436 Transverse strut
437 Roller-blind arrangement/roller-blind-like mount
438 Exit slot
501 Vehicle seat
512 Seat rail
510 Lower seat part
520 Passenger-compartment floor
530 Seat-side edge
532 Resting surface
533 Flexible supporting element
537 Roller-blind arrangement/roller-blind-like mount
A Stowage position A' Stowage position
B Use position
B' Use position
F Direction of travel
P Arrow
X Longitudinal direction of the vehicle
X' Arrow
X" Arrow
XZ Longitudinal vertical plane
Y Transverse direction of the vehicle
Y' Double arrow
Z Vertical direction

The invention claimed is:

1. A vehicle seat, comprising:
a lower seat part, which has a seat surface and is couplable to a vehicle structure having a passenger-compartment floor;
a backrest having a backrest surface; and
a foot and/or a calf support having a resting surface, wherein
the foot and/or calf support is movable between a stowage position and a use position,
the foot and/or calf support is arranged, by way of a first, seat-side edge, in front of, on or beneath the lower seat part and has a free edge, which is directed away from the seat-side edge and is spaced apart in front of the lower seat part and is coupled to the vehicle structure, and
the foot and/or calf support is formed by, or has, at least one supporting element, which forms the resting surface, wherein the supporting element is an at least two-dimensionally flexible sheet structure,
wherein the free edge, which is directed away from the seat-side edge, is provided, on sides thereof, with guide elements, which guide elements are guided for longitudinal sliding displacement in a guide-rail arrangement, which guide-rail arrangement is connected to the vehicle structure.

2. The vehicle seat according to claim 1, wherein the flexible sheet structure of the supporting element is formed from a textile web, a sheet-material web, or a net material.

3. The vehicle seat according to claim 1, wherein the flexible sheet structure of the supporting element is elastically deformable and, in the use position, is stretched in a vehicle longitudinal direction.

4. The vehicle seat according to claim 3, wherein the flexible sheet structure of the supporting element is elastically deformable and, in the use position, is stretched in a vehicle transverse direction.

5. The vehicle seat according to claim 1, wherein the flexible sheet structure of the supporting element is elastically deformable and, in the use position, is stretched in a vehicle transverse direction.

6. The vehicle seat according to claim 1, wherein the foot and/or calf support has the first, seat-side edge connected to the lower seat part.

7. The vehicle seat according to claim 1, wherein the foot and/or calf support is formed by, or has, at least two flexible supporting elements, which together form the resting surface and are movable telescopically relative to one another.

8. The vehicle seat according to claim 1, wherein the at least one supporting element comprises a roller-blind arrangement, which forms the resting surface.

9. The vehicle seat according to claim 8, wherein the roller-blind arrangement is arranged on or beneath the lower seat part or is arranged in front of the lower seat part and is connected to the passenger-compartment floor.

10. The vehicle seat according to claim 1, wherein the guide-rail arrangement comprises a left-hand rail and a right-hand rail, which right-hand rail is spaced apart laterally from the left-hand rail,
wherein a left guide element of the guide elements, which is provided on the left-hand side of the free edge of the foot and/or calf support, is accommodated by the left-hand rail for displacement in the manner of a slide, and a right guide element of the guide elements, which is provided on the right-hand side of the free edge of the foot and/or calf support, is accommodated by the right-hand rail for displacement in the manner of a slide.

11. The vehicle seat according to claim 10, wherein the left and right guide elements are slidably displaceable synchronously in the respective guide rails via at least one drive device.

12. A vehicle comprising at least one vehicle seat according to claim 1.

13. A vehicle seat, comprising:
a lower seat part, which has a seat surface and is couplable to a vehicle structure having a passenger-compartment floor;
a backrest having a backrest surface; and
a foot and/or a calf support having a resting surface, wherein
the foot and/or calf support is movable between a stowage position and a use position,
the foot and/or calf support is arranged, by way of a first, seat-side edge, in front of, on or beneath the lower seat part and has a free edge, which is directed away from the seat-side edge and is spaced apart in front of the lower seat part and is coupled to the vehicle structure, and
the foot and/or calf support is formed by, or has, at least one supporting element, which forms the resting surface, wherein the supporting element is an at least two-dimensionally flexible sheet structure,
wherein the foot and/or calf support is formed by, or has, at least two flexible supporting elements, which together form the resting surface and are movable telescopically relative to one another.

14. The vehicle seat according to claim 13, wherein the flexible sheet structure of the supporting element is formed from a textile web, a sheet-material web, or a net material.

15. The vehicle seat according to claim 13, wherein the flexible sheet structure of the supporting element is elastically deformable and, in the use position, is stretched in a vehicle longitudinal direction.

16. The vehicle seat according to claim 13, wherein the flexible sheet structure of the supporting element is elastically deformable and, in the use position, is stretched in a vehicle transverse direction.

17. A vehicle seat, comprising:
a lower seat part, which has a seat surface and is couplable to a vehicle structure having a passenger-compartment floor;
a backrest having a backrest surface; and
a foot and/or a calf support having a resting surface, wherein the foot and/or calf support is movable between a stowage position and a use position, the foot and/or calf support is arranged, by way of a first, seat-side edge, in front of, on or beneath the lower seat part and has a free edge, which is directed away from the seat-side edge and is spaced apart in front of the lower seat part and is coupled to the vehicle structure, and the foot and/or calf support is formed by, or has, at least one supporting element, which forms the resting surface, wherein the supporting element is an at least two-dimensionally flexible sheet structure, wherein the at least one supporting element comprises a roller-blind arrangement, which forms the resting surface.

18. The vehicle seat according to claim 17, wherein the flexible sheet structure of the supporting element is formed from a textile web, a sheet-material web, or a net material.

19. The vehicle seat according to claim 17, wherein the flexible sheet structure of the supporting element is elastically deformable and, in the use position, is stretched in a vehicle longitudinal direction.

20. The vehicle seat according to claim 17, wherein the flexible sheet structure of the supporting element is elastically deformable and, in the use position, is stretched in a vehicle transverse direction.

* * * * *